United States Patent Office 3,132,146
Patented May 5, 1964

3,132,146
ANALOG OF 10-METHOXY DESERPIDINE AND ITS PREPARATION
Andre Allais and Pierre Girault, Paris, France, assignors, by mesne assignments, to Roussel-Uclaf, S.A., Paris, France, a corporation of France
No Drawing. Filed Oct. 18, 1961, Ser. No. 146,013
Claims priority, application France Oct. 26, 1960
4 Claims. (Cl. 260—287)

This invention relates to a new derivative of yohimbane, its process of preparation and the intermediates produced. Particularly, this invention relates to the racemic and optically active 18β-(3',4',5'-trimethoxybenzoyloxy)-10,17α-dimethoxy - 16β - carbo-carboxymethoxy-3β,20α-yohimbane of the formula:

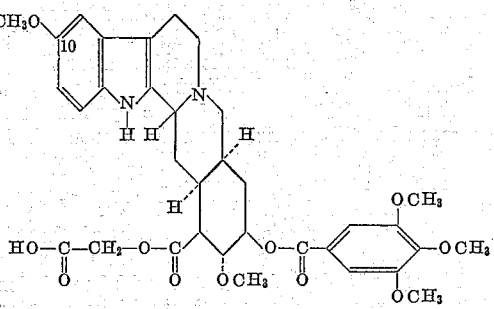

and its therapeutically-acceptable basic addition salts.

There have already been described a large number of esters of reserpine and its analogs, obtained either by changing the acid radical of the trimethoxy-benzoic acid in the 18 position, by making variations in the alkyl radical which esterifies the carboxyl group in the 16 position, or by making various substitutions to the pentacyclic yohimbane structure. However, esters of the reserpic acid series in which the 16 position carries a free acid function are not known.

An object of this invention is the obtention of 18β-(3',4',5' - trimethoxybenzoyloxy) - 10,17α - dimethoxy-16β - carbo - carboxymethoxy - 3β,20α - yohimbane of the formula:

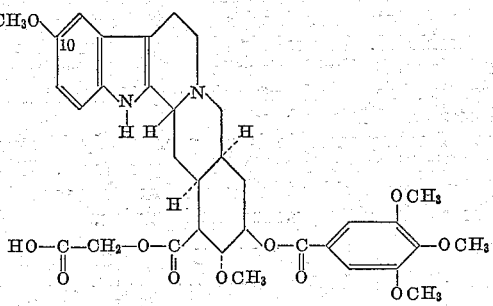

and particularly the levorotatory isomer either as a free acid or as a salt with a therapeutically-acceptable base.

A further object of the invention is the development of a process for the preparation of said 18β-(3',4',5'-trimethoxybenzoyloxy) - 10,17α - dimethoxy - 16β - carbo-carboxymethoxy-3β,20α-yohimbane.

Another object of the invention is the obtention, as novel industrial products, of the intermediate products for the preparation of said 18β-(3',4',5'-trimethoxybenzoyloxy) - 10,17α - dimethoxy - 16β - carbo-carboxymethoxy-3β,20α-yohimbane, namely:

Levorotatory 18β-hydroxy-10,17α-dimethoxy-16β-carbobenzyloxy-3β,20α-yohimbane;
Levorotatory 18β-(3',4',5'-trimethoxybenzoyloxy)-10,17α-dimethoxy-16β-carbobenzyloxy-3β,20α-yohimbane (free base);
The levorotatory hydrochloride of 18β-(3',4',5'-trimethoxybenzoyloxy)-10,17α-dimethoxy - 16β - carbobenzyloxy-3β,20α-yohimbane;
Levorotatory 18β-(3',4',5'-trimethoxybenzoyloxy)-10,17α-dimethoxy-16β-carboxy-3β,20α-yohimbane (free base);
The levorotatory hydrochloride of 18β-(3',4',5'-trimethoxybenzoyloxy)-10,17α-dimethoxy-16β-carboxy-3β,20α-yohimbane;
Levorotatory 18β-(3',4',5'-trimethoxybenzoyloxy)-10,17α-dimethoxy-16β-carbochloride-3β-20α-yohimbane.

These and other objects of the invention will become more apparent as the description thereof proceeds.

We have discovered, and this is our invention, an analog of reserpine, namely, 10-methoxy deserpidine, whose carboxyl group in the 16 position is esterified by glycolic acid, such that the resulting product carries a free carboxyl group. The new compound according to the invention, 18β - (3',4',5' - trimethoxybenzoyloxy) - 10,17α - dimethoxy-16β-carbocarboxymethoxy - 3β,20α - yohimbane or carboxymethyl 10-methoxydeserpidate has the Formula I:

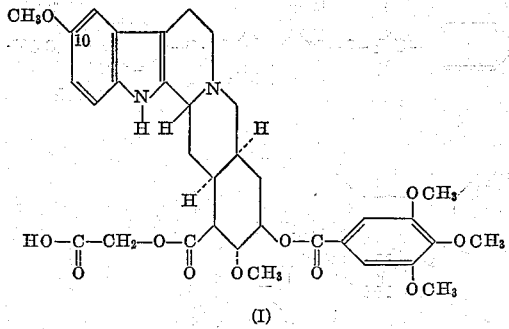

(I)

In comparison with known compounds of the series of reserpine and its analogs, the product of the invention can be easily solubilized in water in the form of a salt of an appropriate therapeutically-acceptable inorganic or organic base. The product has pronounced anti-hypertensive properties and it is devoid of a neurodepressor effect, even in very high doses.

Levorotatory 18β-(3',4',5'-trimethoxybenzoyloxy)-10,17α-dimethoxy - 16β - carbo-carboxymethoxy-3β,20α-yohimbane is an amorphous powder having a melting point of 270–275° C. and a specific rotation $[\alpha]_D^{20} = -150.5° \pm 1°$ (c.=0.5% in chloroform). It is soluble in chloroform and dilute aqueous alkalis, very slightly soluble in alcohol and acetone, and insoluble in water, ether, benzene and dilute aqueous acids.

18β - (3',4',5' - trimethoxybenzoyloxy) - 10,17α-dimethoxy - 16β - carbo - carboxymethoxy - 3β,20α - yohimbane, or carboxymethyl 10-methoxy-deserpidate, is produced by the process illustrated in the flow diagram of Table I.

TABLE I

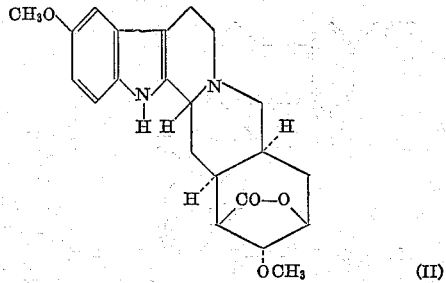

(II)

↓

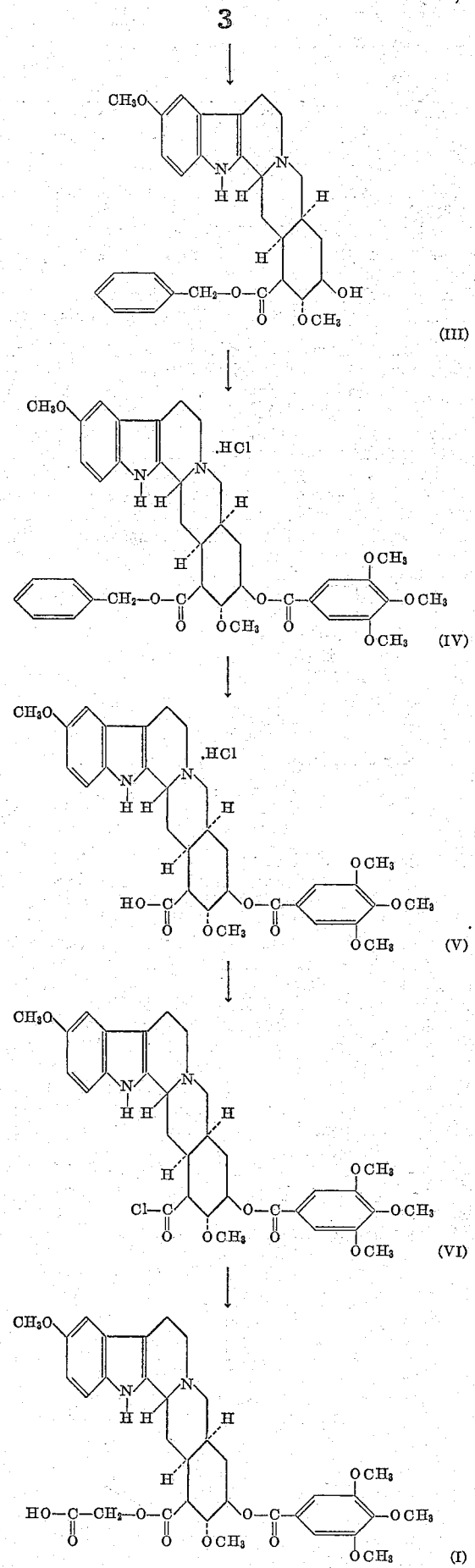

This process utilizes as starting material the 16,18-lactone of 18β - hydroxy - 10,17α-dimethoxy-16β-carboxy-3β,20α-yohimbane. It is applicable to the optically active forms as well as the racemate depending upon whether one starts with an optically active lactone or the racemic lactone. These lactones are described in the literature.

Compound I is produced starting from the 16,18-lactone of 18β-hydroxy-10,17α-dimethoxy-16β-carboxy-3β,20α-yohimbane, II, by the following reactions:

(a) Esterification with benzyl alcohol in the presence of an alkali metal benzylate of the lactone II to give 18β-hydroxy-10,17α-dimethoxy-16β - carbobenzyloxy - 3β,20α-yohimbane, III;

(b) Esterfication of the 18-hydroxyl group of Compound III by an esterification derivative of 3,4,5-trimethoxy benzoic acid, such as the anhydride or chloride, in the presence of an organic nitrogen solvent, which furnishes 18β-(3′,4′,5′-trimethoxy benzoyloxy)-10,17α-dimethoxy-16β-carbobenzyloxy-3β,20α-yohimbane, IV;

(c) Hydrogenolysis of compound IV to remove benzyl alcohol and to give 18β-(3′,4′,5′-trimethoxybenzoyloxy)-10,17α-dimethoxy-16β-carboxy-3β,20α-yohimbane, V;

(d) Esterification with glycolic acid of the carboxyl in the 16 position of 18β-(3′,4′,5′-trimethoxybenzoyloxy)-10,17α-dimethoxy-16β-carboxy - 3β,20α - yohimbane, V. Advantageously, this esterification is accomplished by previously transforming 18β-(3′,4′,5′-trimethoxybenzoyloxy)-10,17α-dimethoxy-16β-carboxy - 3β,20α-yohimbane, V, into the corresponding acid chloride, VI.

In the preferable mode of execution of the above process:

(a) The esterification of the lactone with benzyl alcohol is effected under anhydrous conditions with benzyl alcohol in the presence of sodium benzylate. The reaction is conducted in the presence of an inert organic solvent such as methylene chloride at reflux temperatures.

(b) The esterification of the 18-hydroxyl group is effected with 3,4,5-trimethoxybenzoic acid anhydride in the presence of pyridine and triethylamine at a temperature between about 85° C. and about 95° C.

(c) The hydrogenolysis to remove benzyl alcohol is effected with hydrogen in the presence of a hydrogenolysis catalyst such as palladized carbon black in an inert organic solvent such as methanol.

(d) The esterification of the 16-carboxyl with glycolic acid is effected by reacting the hydrochloride salt of compound V in an inert organic solvent such as chloroform with phosphorous pentachloride to give the corresponding acid chloride VI. The solution in chloroform of the acid chloride is reacted with glycolic acid in the presence of an organic nitrogen solvent such as pyridine and the desired compound I is isolated.

The following example is given as purely illustrative without limiting the invention in any manner. It will be obvious to one skilled in the art that other procedures may be employed to practice the invention.

EXAMPLE

*Preparation of Levorotatory 18β-(3′,4′,5′-Trimethoxybenzoyloxy)-10,17α-Dimethyl-16β - Carbo - Carboxymethoxy-3β,20α-Yohimbane, I*

STEP A.—PREPARATION OF LEVOROTATORY 18β-HYDROXY-10,17α-DIMETHOXY - 16β - CARBOBENZYLOXY- 3β,20α-YOHIMBANE, III

A solution of 10 gm. of the optically active lactone of 10,17α-dimethoxy-16β-carboxy-18β-hydroxy - 3β,20α - yohimbane, II, was prepared by introducing the lactone under nitrogen into the following mixture:

| | Cc. |
|---|---|
| Anhydrous methylene chloride | 40 |
| Anhydrous benzyl alcohol | 12 |
| Solution of sodium benzylate containing 0.5% of sodium in benzyl alcohol | 10 |

Then, while continuing the agitation and maintaining an atmosphere of nitrogen, the reaction mixture was heated at reflux for a period of 16 hours. The reaction mixture was next cooled, washed with water until the wash waters were neutral, dried over sodium sulfate, filtered and the sodium sulfate washed several times with methylene chloride. The filtrate and the solvent of washing were combined and brought to dryness under vacuum. The residue was taken up with 50 cc. of isopropyl ether, vacuum filtered, triturated several times with isopropyl ether and dried under vacuum. 11.5 gm. of raw levorotatory 18β-hydroxy-10,17α-dimethoxy-16β-carbobenzyloxy-3β,20α-yohimbane, III, were obtained which was used as such for the next step of the synthesis.

The product was soluble in alcohol, acetone, benzene and chloroform, and slightly soluble in ether and isopropyl ether.

STEP B.—PREPARATION OF THE LEVOROTATORY HYDROCHLORIDE OF 18β-(3',4',5'-TRIMETHOXYBENZOYLOXY) - 10,17α - DIMETHOXY-16β-CARBOBENZYLOXY-3β,20α-YOHIMBANE, IV 11.5 gm. of raw levorotatory 18β-hydroxy-10,17α-dimethoxy-16β-carbobenzyloxy-3β,20α-yohimbane, III, obtained according to the preceding step, and 19 gm. of 3,4,5-trimethoxybenzoic acid anhydride were introduced into a mixture of 35 cc. of anhydrous pyridine and 17 cc. of anhydrous triethylamine. The reaction mixture was maintained under nitrogen for a period of 20 hours at 92° C.±1° C.; then 5 cc. of water were added and the same conditions maintained for about 30 minutes more. Next, the reaction mixture was cooled and poured into 200 cc. of water.

The extraction of the reaction product, the free base, was effected in 4 aliquots with 50 cc. of methylene chloride. The combined extracts were next washed several times with water, then with a solution containing 2% ammonia, then again with water, then with an excess of 2 N hydrochloric acid and finally with water again. The extract was dried over sodium sulfate, filtered and the sodium sulfate washed with methylene chloride. The filtrate and the solvent of washing were combined and concentrated under nitrogen to a reduced volume. 40 cc. of ethanol were added thereto and the distillation was continued under nitrogen until the start of crystallization. Then the mixture was cooled and allowed to remain overnight in a refrigerator. The product was next vacuum filtered, triturated with iced ethanol, then with ether and dried under vacuum. 7.3 gm. of the levorotatory hydrochloride of 18β-(3',4',5'-trimethoxybenzoyloxy) - 10,17α - dimethoxy - 16β - carbobenzyloxy-3β,20α-yohimbane, IV, were obtained which product was purified by repeated recrystallizations from a mixture of ethanol and methylene chloride. The purified product had a melting point of 268–270° C. and a specific rotation [α]$_D^{20}$=—65.2° (c.=1% in 1 part of ethanol and 2 parts of methylene chloride).

The product was soluble in the said mixture of ethanol and methylene chloride; very slightly soluble in alcohol, ether, acetone, benzene and chloroform; and insoluble in water.

Analysis.—$C_{39}H_{45}O_9N_2Cl$: Molecular weight=721.2. Calculated: C, 64.95%; H, 6.23%; N, 3.88%; Cl, 4.91%. Found: C, 64.9%; H, 6.5%; N, 3.9%; Cl, 5.0%.

This compound is not described in the literature.

STEP C.—PREPARATION OF THE LEVOROTATORY HYDROCHLORIDE OF 18β-(3',4',5'-TRIMETHOXYBENZOYLOXY)-10,17α-DIMETHOXY-16β-CARBOXY - 3β,20α - YOHIMBANE, V

A solution of 13.5 gm. of the levorotatary hydrochloride of 18β-(3',4',5'-trimethoxybenzoyloxy)-10,17α-dimethoxy-16β-carbobenzyloxy-3β,20α-yohimbane, IV, in 1,500 cc. of methanol was subjected to hydrogenolysis for a period of 2 hours in the presence of 1.5 gm. of palladized carbon black containing 10% palladium.

Next, the catalyst was separated by filtration and the filter cake was washed with methanol. The filtrate and the solvent of washing were combined and concentrated to a reduced volume. This solution was next cooled for a period of 1 hour. The crystals obtained were vacuum filtered, washed with iced methanol and dried under vacuum.

9.5 gm. of the raw hydrochloride of 18β-(3',4',5'-trimethoxybenzoyloxy) - 10,17α - dimethoxy - 16β - carboxy-3β,20α-yohimbane, V, were obtained, which product was recrystallized by solution at elevated temperatures in a mixture of ethanol and methylene chloride, filtration and distillation of the methylene chloride under nitrogen, and crystallization by allowing the residual solution to stand. The yield on recrystallization was of the order of 80%. The purified product had a melting point of 254–256° C. and a specific rotation [α]$_D^{20}$=—104.4° (c.=1% in a 1:1 ethanol-methylene chloride mixture).

The product was soluble in the said ethanol-methylene chloride mixture; soluble in hot ethanol containing 70% water and hot propylene glycol containing 40% water; and insoluble in water, alcohol, ether, acetone, benzene, chloroform, and dilute aqueous acids and alkalis.

Analysis.—$C_{32}H_{39}O_9N_2Cl$: Molecular weight=631.1. Calculated: C, 60.89%; H, 6.23%; N, 4.43%; Cl, 5.62%. Found: C, 60.7%; H, 6.4%; N, 4.3%; Cl, 5.5.

This compound is not described in the literature.

STEP D.—PREPARATION OF LEVOROTATORY 18β-(3',4',5'-TRIMETHOXYBENZOYLOXY)-10,17α - DIMETHOXY - 16β-CARBO-CARBOXYMETHOXY-3β,20α - YOHIMBANE, I 5 gm. of the hydrochloride of 18β-(3',4',5'-trimethoxybenzoyloxy) - 10,17α - dimethoxy - 16β - carboxy - 3β,20α-yohimbane, V, were introduced into 50 cc. of chloroform. 1.25 g. of anhydrous pyridine were added; then 1.65 gm. of phosphorus pentachloride were introduced and the reaction mixture was allowed to stand at rest for a period of 16 hours at room temperature. Next, the reaction mixture was evaporated to dryness under vacuum. The residue was raw levorotatory 18β-(3',4',5'-trimethoxybenzoyloxy) - 10,17α - dimethoxy - 16β - carbochloride-3β,20α-yohimbane, VI, and was used without further purification in the next step of the synthesis.

This residue was taken up with 25 cc. of anhydrous chloroform. A solution of 1.25 gm. of anhydrous glycolic acid in 10 cc. of anhydrous pyridine was added, and the reaction was allowed to occur during a period of 1 hour at room temperature. The reaction mixture was then poured into a separatory funnel, washed with water, then with a dilute acetic acid solution and again with water. The reaction solution was next treated with animal black, filtered, and the filter cake washed with chloroform. The wash liquid and solution were combined and brought to dryness. The residue was taken up with 25 cc. of water and triturated, vacuum filtered, washed with water, then methanol and dried under vacuum.

3.9 gm. of raw levorotatory 18β-(3',4',5'-trimethoxybenzoyloxy)-10,17α-dimethoxy-16β-carbo - carboxymethoxy-3β,20α-yohimbane, I, were obtained which was purified by solution in a mixture of ethanol and methylene chloride, filtration of the solution obtained and distillation under nitrogen in order to remove the methylene chloride. The solution was iced for a period of 1 hour, vacuum filtered and 2 gm. of purified product (amorphous) were obtained, having a melting point of 270–275° C. and a specific rotation [α]$_D^{20}$=—150.5°±1° (c.=0.5% in chloroform).

The product occurred in the form of an amorphous powder, soluble in chloroform and dilute aqueous alkalis; very slightly soluble in alcohol and acetone; and insoluble in water, ether, benzene and dilute aqueous acids.

Analysis.—$C_{34}H_{40}O_{11}N_2$: Molecular weight=652.7. Calculated: C, 62.56%; H, 6.17%; N, 4.29%. Found: C, 62.3%; H, 6.4%; N, 4.2%.

This compound is not described in the literature.

The levorotatory 18β-(3',4',5'-trimethoxybenzoyloxy)-

10,17α-dimethoxy-16β - carbo-carboxymethoxy - 3β,20α-yohimbane, I, so obtained can be neutralized with any therapeutically-acceptable inorganic or organic base to form a salt with the free carboxy group attached in the 16 position. Among such bases are the alkali metal hydroxides, carbonates, etc.; primary aliphatic amines such as ethanolamine, methylamine, etc.; and others.

The preceding specific embodiment of the invention is for illustrative purposes only and is not to be construed as limiting the invention. Such modifications and changes as would be apparent to one skilled in the art may be made without departing from the spirit of the invention and the scope of the appended claims.

We claim:

1. A compound selected from the group consisting of racemic and optically active 18β-(3',4',5'-trimethoxybenzoyloxy)-10,17α - dimethoxy - 16β - carbo-carboxymethoxy-3β,20α-yohimbane of the formula:

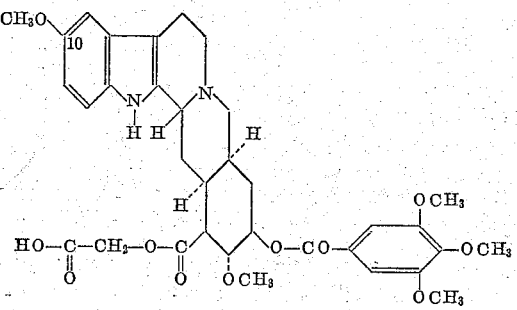

and its alkali metal salts and its primary, aliphatic amine salts.

2. Levorotatory 18β-(3',4',5'-trimethoxybenzoyloxy)-10,17α-dimethoxy-16β - carbo - carboxymethoxy-3β,20α-yohimbane.

3. A process for the preparation of a compound selected from the group consisting of racemic and optically active 18β-(3',4',5' - trimethoxybenzoyloxy)-10,17α-dimethoxy-16β-carbo - carboxymethoxy-3β-,20α-yohimbane of the formula:

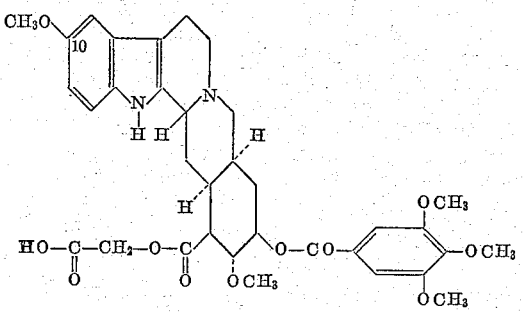

and its alkali metal salts and its primary, aliphatic amine salts, which comprises the steps of esterifying the 16,18 lactone of 18β-hydroxy-10,17α-dimethoxy-16β-carboxy-3β,20α-yohimbane with benzyl alcohol in the presence of an alkali metal benzylate, subjecting the 18β-hydroxy-10,17α-dimethoxy - 16β-carbobenzyloxy - 3β,20α-yohimbane obtained to the action of an esterifying derivative of 3,4,5-trimethoxy benzoic acid selected from the group consisting of the acid anhydride and the acid chloride in the presence of an organic nitrogen solvent, subjecting the 18β-(3',4',5'-trimethoxybenzoyloxy)-10,17α-dimethoxy-16β-carbobenzyloxy-3β,20α-yohimbane obtained to hydrogenolysis in the presence of a hydrogenolysis catalyst, reacting the 18β-(3',4',5'-trmethoxybenzoyloxy)-10,17α-dimethoxy-16β-carboxy - 3β,20α - yohimbane obtained with phosphorus pentachloride in an inert organic solvent, esterifying the 18β-(3',4',5'-trimethoxybenzoyloxy)-10,17α - dimethoxy-16β-carbochloride - 3β,20α-yohimbane obtained with glycolic acid in the presence of an organic nitrogen solvent and recovering said 18β-(3',4',5'-trimethoxybenzoyloxy)-10,17α - dimethoxy-16β-carbo-carboxymethoxy-3β,20α-yohimbane compounds.

4. A process for the preparation of a compound selected from the group consisting of racemic and optically active 18β-(3',4',5'-trimethoxybenzoyloxy) - 10,17α - dimethoxy-16β-carbo - carboxymethoxy-3β-,20α-yohimbane of the formula:

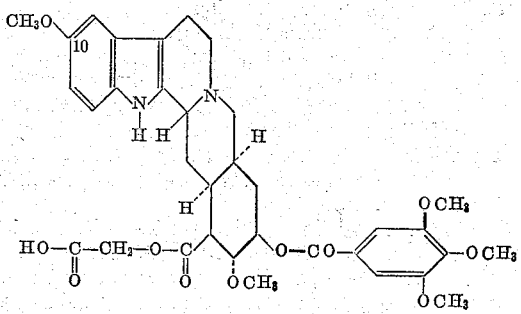

and its alkali metal salts and its primary, aliphatic amine salts, which comprises the steps of reacting 18β-(3',4',5'-trimethoxybenzoyloxy)-10,17α-dimethoxy - 16β-carboxy-3β,20α-yohimbane with phorphorus pentachloride in an inert organic solvent, esterifying the 18β-(3',4',5'-trimethoxybenzoyloxy)-10,17α-dimethoxy-16β - carbochloride-3β,20α-yohimbane obtained with glycolic acid in the presence of an organic nitrogen solvent and recovering said 18β-(3',4',5'- - trimethoxybenzoyloxy) - 10,17α-dimethoxy-16β-carbo-carboxymethoxy-3β,20α - yohimbane compounds.

References Cited in the file of this patent

UNITED STATES PATENTS

| | | |
|---|---|---|
| 2,857,385 | Kuehne | Oct. 21, 1958 |
| 3,031,453 | Lucas | Apr. 24, 1962 |

FOREIGN PATENTS

| | | |
|---|---|---|
| 1,029,003 | Germany | Apr. 30, 1958 |

OTHER REFERENCES

Wagner et al.: Synthetic Org. Chem., Wiley and Sons, New York (1953), pages 480, 482.

Groggins: Unit Processes in Org. Synthesis, McGraw-Hill, New York (1958), pages 717 and 718.